Dec. 7, 1926. 1,609,464

A. J. COMPTON

TRACTION DEVICE

Filed April 14, 1925

Andrew J. Compton
INVENTOR

BY Victor J. Evans
ATTORNEY

WITNESS:

Patented Dec. 7, 1926.

1,609,464

UNITED STATES PATENT OFFICE.

ANDREW J. COMPTON, OF TRENTON, NEW JERSEY.

TRACTION DEVICE.

Application filed April 14, 1925. Serial No. 23,038.

This invention relates to improvements in mud hooks and the like and contemplates the provision of a channeled-shaped body having spurs provided upon the outer side and a plurality of transversely disposed ridges upon its inner side and which are adapted to be engaged by tread of a tire and to be firmly engaged thereby and when so placed in an icy rut in a roadway or the like will allow the vehicle rear wheel or driving wheel to climb upon it and pull itself out of the rut on its own power.

Another object of the invention is the provision of pairs of apertured lugs extending upwardly from diametrically opposite sides and are slightly inwardly curved and conform to the curvature of a tire in order that the tire and wheel of the vehicle when so climbing upon this mud hook or traction device will be guided along its channel.

A further object of the invention is that when using this invention as a mud hook it is of course obvious that this invention will be attached to the tire or driving wheel of the vehicle and in so doing, ropes, straps or other suitable fastening means are passed through the apertured ends of the lugs and pass around the felly and spokes of the driving wheel in order that the same will be rigidly held thereto in the act of the vehicle pulling itself out of the mud holes and the like upon its own power.

With the above and other objects in view, the invention further includes the following novel features and details of construction, to be hereinafter more fully described, illustrated in the accompanying drawings and pointed out in the appended claim.

In the drawing:—

Figure 1:
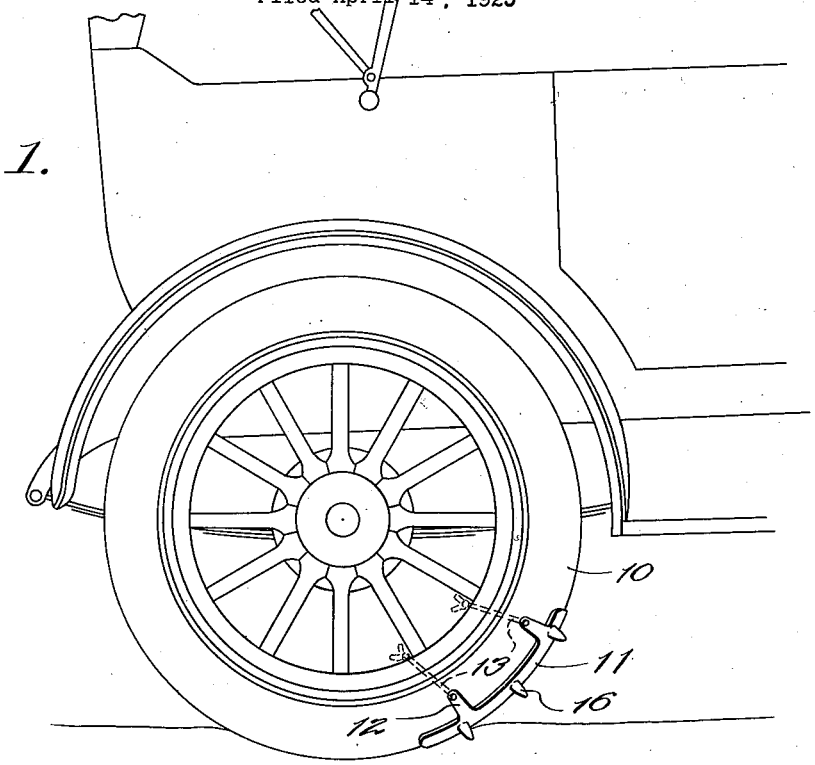
Figure 1 is a side elevation of a rear portion of the vehicle, showing the manner in which my invention is applied to the driving wheel of a vehicle.
Figure 2:
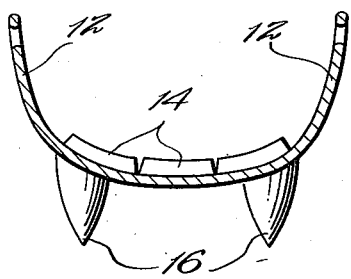
Figure 2 is a transverse section taken through my invention.
Figure 3:
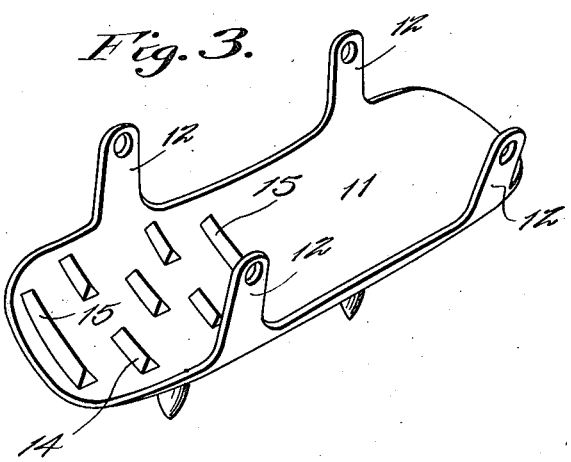
Figure 3 is a detail perspective thereof.

Referring to the drawing in detail, wherein like characters of reference denote corresponding parts, the reference character 10 indicates the driving wheel of a vehicle to which my present invention is shown applied. The invention resides in the provision of a channel-shaped plate 11 of substantially U-shaped cross section having apertured lugs 12 extending in pairs at diametrically opposite sides and upon the upper edges of the plates 11 and which are adapted to receive therein straps, ropes or other suitable fastening means as indicated at 13 in Figure 1 of the drawing and which may be passed around the felly and spokes of the wheel 10 and fastened in any suitable manner thereon.

When using this invention for releasing the vehicle from a rut or other obstruction in a road which is ordinarily slippery, and without tying the same upon the vehicle wheel in so far as the wheel will not make a complete revolution in removing itself from the mud holes or rut, the plate 11 is placed in the position shown in Figure 1 of the drawing. Owing to the provision of large and small transversely disposed lugs 14 and 15 provided upon the inner sides of the plate 11 and adjacent the lower end thereof the tread of the tire or the tire itself, even if it be smooth, will be caused to be engaged by these lugs 14 and 15 and climb thereupon and be guided along the channel portion of the plate 11 and remove itself from the mud hole or depression upon its own power.

It is of course obvious that when the vehicle is stuck in a mud hole on an exceedingly muddy road and if the vehicle will likely be again caught in a rut the invention is then tied to the vehicle wheel 10 through the instrumentality of the straps or ropes 13. In order to provide such traction means for the plate 11 as will prevent circumferential movement with the vehicle wheel 10 when it is stuck in the rut or depression I provide pointed lugs 16 upon its under and outer sides and which owing to their pointed character will engage rocks and hard substances as well as mud and prevent the circumferential movement of the wheel 10 and its slipping and give the traction desired thereto.

The invention is susceptible of various changes in its form, proportions and minor details of construction, and the right is herein reserved to make such changes as properly fall within the scope of the appended claim.

Having described my invention what is claimed is:—

A traction plate for use upon motor vehicle wheels and tires comprising a longitudinally disposed arcuate shaped plate having spaced pairs of upwardly extending apertured ears upon their upper edges, a plurality of long and short transversely disposed triangular shaped lugs arranged upon the inner side of the plate and engaging the tread of the motor vehicle tire to prevent independent circumferential movement thereof, and fastening means in the form of a cable being laced within the apertured ears and around the felly of the wheel to prevent accidental displacement of the plate.

In testimony whereof I affix my signature.

ANDREW J. COMPTON.